United States Patent
Chanal et al.

(10) Patent No.: US 12,049,192 B2
(45) Date of Patent: Jul. 30, 2024

(54) METHOD FOR ULTRA HIGH FREQUENCY CONTINUOUS COMMUNICATION WITH AND LOCATION OF A PORTABLE DEVICE FOR "HANDS-FREE" ACCESS TO A MOTOR VEHICLE

(71) Applicant: Continental Automotive Technologies GmbH, Hannover (DE)

(72) Inventors: Sébastien Chanal, Toulouse (FR); Sylvain Godet, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 112 days.

(21) Appl. No.: 17/909,027

(22) PCT Filed: Mar. 4, 2021

(86) PCT No.: PCT/EP2021/055494
§ 371 (c)(1),
(2) Date: Sep. 2, 2022

(87) PCT Pub. No.: WO2021/176006
PCT Pub. Date: Sep. 10, 2021

(65) Prior Publication Data
US 2023/0092743 A1 Mar. 23, 2023

(30) Foreign Application Priority Data
Mar. 5, 2020 (FR) ..................... 2002215

(51) Int. Cl.
*B60R 25/24* (2013.01)
*G01S 5/02* (2010.01)
*H04W 4/02* (2018.01)

(52) U.S. Cl.
CPC .......... *B60R 25/245* (2013.01); *G01S 5/0226* (2013.01); *G01S 5/0284* (2013.01); *H04W 4/025* (2013.01); *B60R 2325/101* (2013.01)

(58) Field of Classification Search
CPC ............. B60R 25/245; B60R 2325/101; G01S 5/0226; G01S 5/0284; H04W 4/025
(Continued)

(56) References Cited

U.S. PATENT DOCUMENTS

| | | | |
|---|---|---|---|
| 6,278,869 B1 * | 8/2001 | Lindenmeier | H04B 7/0811 455/352 |
| 6,677,688 B2 * | 1/2004 | Freeston | H01P 1/15 307/140 |
| 7,265,675 B1 * | 9/2007 | Carrender | H01Q 1/2216 340/572.7 |

(Continued)

FOREIGN PATENT DOCUMENTS

| FR | 3040551 A1 | 3/2017 |
|---|---|---|
| FR | 3047085 A1 | 7/2017 |
| FR | 3082088 A1 | 12/2019 |

OTHER PUBLICATIONS

Tsimbalo et al., "Mitigating Packet Loss in Connectionless Bluetooth Low Energy", 2015 IEEE 2nd World Forum of Internet of Things (WF-IOT), IEEE, 2015, pp. 291-296.
(Continued)

*Primary Examiner* — Zhen Y Wu
(74) *Attorney, Agent, or Firm* — Buchanan Ingersoll & Rooney PC

(57) ABSTRACT

A method and a system for ultra high frequency communication with and location of a portable device for "hands-free" access to a motor vehicle, the motor vehicle having an on-board communication device comprising an ultra high frequency transceiver, an electrical power supply source and at least one antenna, the motor vehicle including a first arrangement, in which the transceiver is connected to the antenna, and a second arrangement, in which the transceiver
(Continued)

is disconnected from the antenna. The transceiver is connected to an attenuation module located at a predetermined distance from the transceiver. The attenuation module includes an impedance of predetermined value connected to ground. The predetermined distance between the transceiver and the attenuation module, as well as the predetermined value of the impedance, defining a locating area of the portable device in and around the motor vehicle.

12 Claims, 10 Drawing Sheets

(58) Field of Classification Search
USPC .......................................................... 340/5.7
See application file for complete search history.

(56) References Cited

U.S. PATENT DOCUMENTS

| | | | |
|---|---|---|---|
| 7,501,959 B2* | 3/2009 | Shirakawa | G01S 3/38 342/437 |
| 10,104,510 B2* | 10/2018 | Lee | G01S 5/0226 |
| 2007/0229278 A1* | 10/2007 | Nagata | G06K 19/073 340/572.7 |
| 2008/0048909 A1* | 2/2008 | Ioffe | B60R 25/00 342/357.31 |
| 2009/0015407 A1* | 1/2009 | Tuttle | H01Q 1/2225 340/572.1 |
| 2014/0306815 A1* | 10/2014 | Henriet | B60C 23/0479 340/447 |
| 2017/0064517 A1* | 3/2017 | Lee | G01S 7/282 |

OTHER PUBLICATIONS

International Search Report and Written Opinion for International Application No. PCT/EP2021/055494, dated Apr. 22, 2021, 11 pages.

International Search Report and Written Opinion for International Application No. PCT/EP2021/055494, dated Apr. 22, 2021, 19 pages (French).

French Search Report for French Application No. 2002215, dated Nov. 12, 2020 with translation, 15 pages.

\* cited by examiner

METHOD FOR ULTRA HIGH FREQUENCY CONTINUOUS COMMUNICATION WITH AND LOCATION OF A PORTABLE DEVICE FOR "HANDS-FREE" ACCESS TO A MOTOR VEHICLE

CROSS REFERENCE TO RELATED APPLICATIONS

This application is the U.S. National Phase Application of PCT International Application No. PCT/EP2021/055494, filed Mar. 4, 2021, which claims priority to French Patent Application No. 2002215, filed Mar. 5, 2020, the contents of such applications being incorporated by reference herein.

FIELD OF THE INVENTION

The invention relates to a system for ultra high frequency communication with and location of a portable device for "hands-free" access to a motor vehicle. A further aim of the invention is a method for implementing the system according to the invention.

More specifically, the invention applies to systems for "hands-free" access to motor vehicles. A system for "hands-free" access to a motor vehicle allows an authorized user to lock and/or unlock the doors of their motor vehicle without using a key. To this end, the motor vehicle identifies and locates a badge or a remote control carried by the user and, when the motor vehicle identifies the badge or the remote control as being associated with the motor vehicle and located in the access area, then said vehicle locks or unlocks its doors.

BACKGROUND OF THE INVENTION

A person skilled in the art knows of this "hands-free" access system. It is generally made up of an electronic control unit on-board the motor vehicle, at least one radio frequency (RF) antenna located on the motor vehicle and a badge or an identification remote control that comprises an RF antenna carried by the user.

An exchange of identifier between the badge and the motor vehicle via the RF antennas allows the badge to be identified by the motor vehicle and allows the locking or unlocking of the doors to be triggered by said motor vehicle.

The identifier can be included in a portable device other than a badge or a remote control, for example, in a portable telephone, or a watch.

In general, the identifier is exchanged by Radio Frequency (RF) waves and by Low Frequency waves. The motor vehicle firstly transmits, via the LF antennas, an LF polling signal and the badge, if it is located in the receiving area of said signal, sends an RF presence message back to the motor vehicle that contains its identifier.

Precisely locating the badge around the motor vehicle is carried out by measuring the intensity of the LF signal received by the badge (via the antennas and the electronic control unit) that originates from the motor vehicle, more commonly called RSSI (Received Signal Strength Indication) measurements (received by an antenna). A locating device on board the motor vehicle analyzes the measurement of the received strength of the signal received by the badge from each LF antenna of the motor vehicle, and thus determines the position of the badge relative to said LF antennas, i.e., relative to the motor vehicle.

This RSSI measurement allows the badge to be precisely located around and inside the motor vehicle in order to allow the doors to be locked/unlocked and also to allow the motor vehicle to start, when the badge is detected inside the motor vehicle.

Increasing numbers of mobile devices, for example, cell phones, are now equipped with the Bluetooth® or Bluetooth Low Energy (BLE) communication standard, i.e., ultra high frequency (UHF) communication from 2,400 MHz to 2,480 MHz. This communication standard has the advantage of being universal and therefore does not require any accreditation that is specific to each country (only a "Bluetooth Low Energy" international certification), as is the case with the current RF and LF communication standards, the operating frequency of which differs according to country.

The hands-free access system therefore needed to be adapted so that it can also operate with the Bluetooth® or Bluetooth Low Energy (BLE) communication standard and not only via radio waves and low frequencies (RF/LF).

The advantage of the Bluetooth® or Bluetooth Low Energy (BLE) communication standard is that it allows a long communication range of approximately 250 meters around the motor vehicle. However, it does not allow the presence of the mobile device to be detected at shorter distances. This is the case, for example, when the portable device is within around ten centimeters of the motor vehicle and the user wishes to unlock their motor vehicle. However, this use was possible with the communication device of the prior art, which operates based on an exchange via RF and LF waves. Indeed, the RSSI measurement of a Bluetooth signal is very imprecise and varies enormously depending on the environment (noise, disturbances) and it is difficult to know whether the portable device is 5 meters, or 10 meters or 40 meters or more away. To this end, specific calibration needs to be carried out that meets the specific features of each portable device.

Also, it is therefore not easy to start the motor vehicle using Bluetooth® or Bluetooth Low Energy (BLE) communication, since starting was only authorized when the portable device was inside the motor vehicle, and within a few centimeters of the UHF antennas of the motor vehicle. However, in view of the considerable variability in the features of the portable devices, detecting said portable device a few centimeters away from the UHF antennas was not possible.

Document FR 3040551 B1, incorporated by reference, proposes an ultra high frequency locating device of the portable device that allows these disadvantages to be overcome. The term "ultra high frequency" is understood to mean the band of the radio spectrum ranging between 300 MHz and 3,000 MHz 1, that is wavelengths of 1 meter to 0.1 meter.

More specifically, the ultra high frequency locating device of the prior art allows the presence of the portable device to be detected at several distances around the motor vehicle, ranging from a few centimeters to several meters, as well as a few centimeters away from the UHF antennas on-board the motor vehicle, which makes "hands free" starting possible with the Bluetooth® or Bluetooth Low Energy (BLE) communication standard, which was not possible with the communication standard in the prior art.

To this end, the locating device D of the prior art comprises, as shown in FIG. 1a, an electrical power supply source Vcc powering a transceiver 10 electrically connected to at least one antenna A by an electric line 20A. Furthermore, the locating device D of the prior art comprises, between the transceiver 10 and the antenna A, i.e., on the electric communication line 20 (transmission/reception) between the transceiver 10 and the antenna A, at least one attenuation module M1. Finally, the locating device D of the prior art also comprises means 30 for controlling the attenuation module M1 and means 40 for determining the location of the portable device.

Thus, the locating device D of the prior art allows the range of the Ultra High Frequency waves to be "degraded" from a maximum range of the prior art of 250 meters to approximately a few centimeters, in order to precisely define locating areas of a portable device in and around a motor vehicle.

However, the effect of this degradation is that it makes long-range communication impossible between the portable device and the motor vehicle, i.e., when the portable device is located outside the locating areas.

However, some uses require a function of the motor vehicle to be triggered long before the user approaches. This involves, for example, functions for remotely controlling the motor vehicle, such as locking/unlocking the doors, heating, defogging, de-icing or even starting.

SUMMARY OF THE INVENTION

An aspect of the invention proposes an ultra high frequency communication system that allows this disadvantage to be overcome.

BRIEF DESCRIPTION OF THE DRAWINGS

Further features and advantages of aspects of the invention will become more clearly apparent from reading the following description. This description is purely illustrative and should be read with reference to the appended drawings, in which.

The figures are not necessarily to scale, in particular in terms of thickness, for the sake of illustration.

DETAILED DESCRIPTION OF THE PREFERRED EMBODIMENTS

The system according to an aspect of the invention proposes adding a long-range communication functionality to the locating device of the prior art. In this way, a portable device and a motor vehicle can communicate together in order to remotely control the motor vehicle, while allowing the motor vehicle to precisely locate the portable device in and around the motor vehicle.

Figure 2:
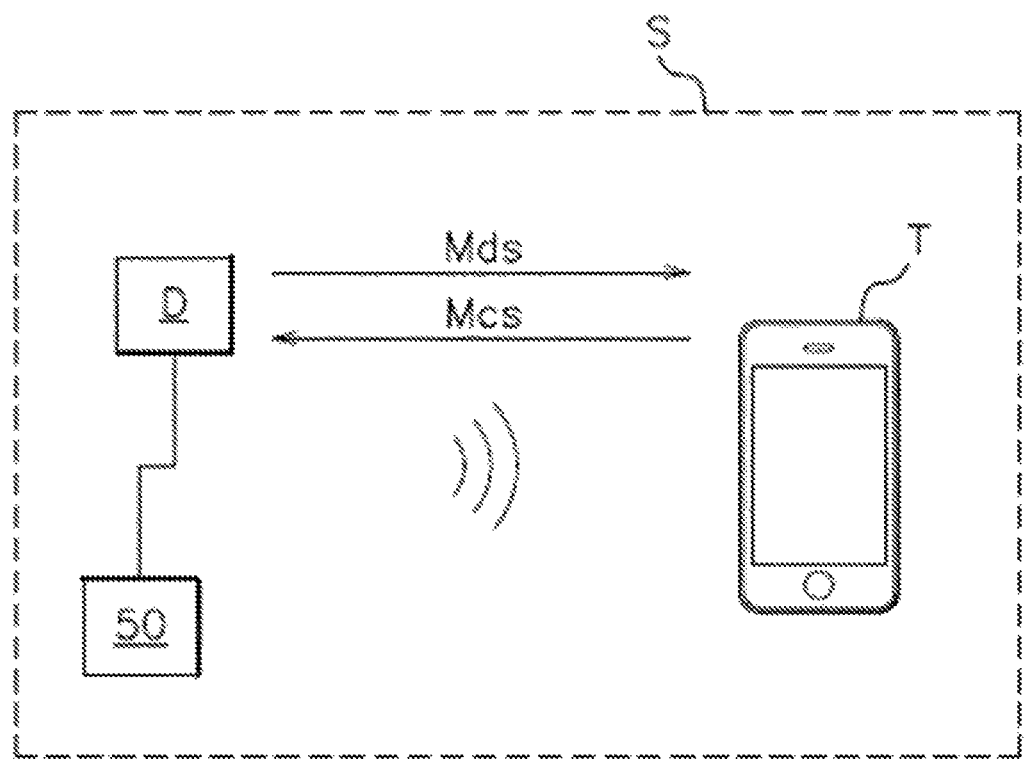
FIG. 2 schematically shows the system S according to an aspect of the invention.

To this end, in FIG. 2, the system S according to an aspect of the invention comprises the device D of the prior art, a computer 50 of the microcontroller type and a portable device T.

Figure 1A:
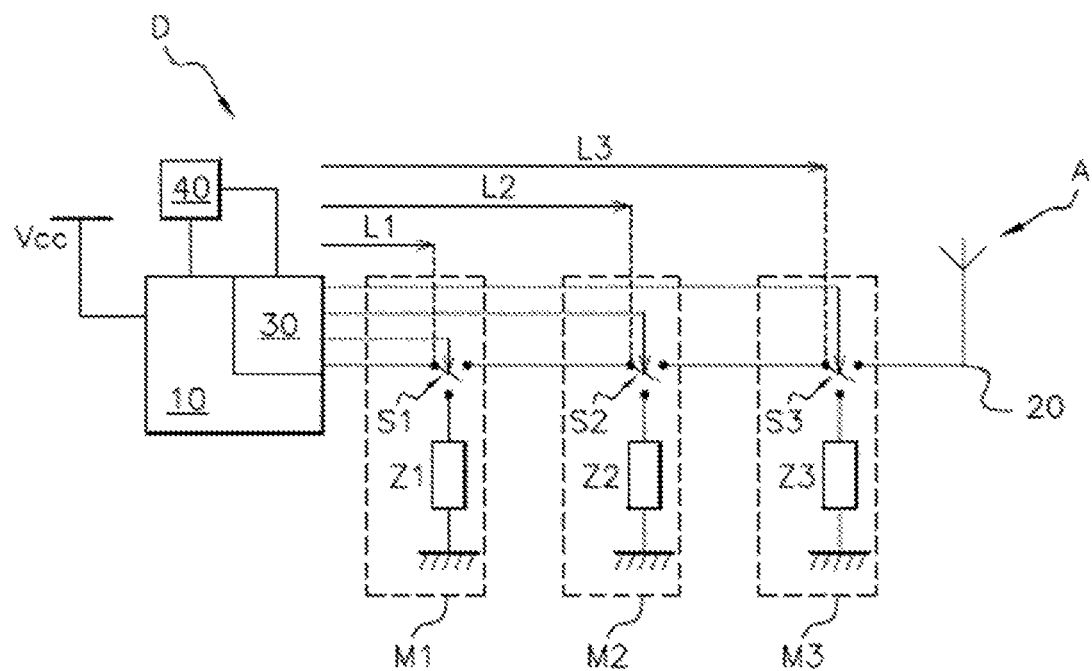
FIG. 1A, explained above, schematically shows the locating device D of the prior art.

The locating device D is shown in FIG. 1A. The locating device D comprises:
an electrical source Vcc;
an Ultra High Frequency transceiver, more specifically a Bluetooth® or Bluetooth Low Energy (BLE) transceiver 10, which comprises a printed circuit;
at least one antenna A.

In FIG. 1A, the locating device D further comprises, between the transceiver 10 and the antenna A, i.e., on the electric communication line 20 (transmission/reception) between the transceiver 10 and the antenna A, at least one attenuation module M1. Said locating device D also comprises means 30 for controlling the attenuation module M1 and means 40 for determining the location of the portable device.

FIG. 1A shows a plurality of attenuation modules located in series on the communication line 20: a first attenuation module M1, a second attenuation module M2, a third attenuation module M3. As shown in FIG. 2, the locating device D also comprises:
means 30 for controlling the plurality of attenuation modules M1, M2, M3, integrated, for example, in the transceiver 10; as well as
means 40 for determining the location of the portable device, electrically connected to the transceiver 10 and to the means 30 for controlling the attenuation module.

Each attenuation module, the first attenuation module M1, the second attenuation module M2, or the third attenuation module M3, is located at a predetermined distance from the transceiver 10, in this case, respectively at a first distance L1, at a second distance L2, at a third distance L3.

Each attenuation module, the first attenuation module M1, the second attenuation module M2, or the third attenuation module M3, also comprises:
a switching means, for example, a switch, respectively, a first switch S1, a second switch S2 and a third switch S3; and
an impedance, respectively a first impedance Z1, a second impedance Z2, and a third impedance Z3, each impedance, the first impedance Z1, the second impedance Z2, and the third impedance Z3, having a predetermined value and being electrically connected to ground.

The predetermined values of the first impedance Z1, the second impedance Z2, and the third impedance are all equal to each other and range between 0 and 100 kΩ, for example, said impedances each have a value of 50Ω.

The control means 30 are configured to activate each attenuation module M1, M2, M3, i.e., each switching means S1, S2, S3, in order to select one of the two following positions:
a first position, in which the transceiver 10 or the previous attenuation module M1, M2 is disconnected from the antenna A or the next attenuation module M2, M3 and in which the transceiver 10 or the preceding attenuation module is electrically connected to the impedance Z1, Z2, Z3 associated with said switching means;
a second position, in which the switching means S1, S2, S3 electrically connect the transceiver 10 or the preceding attenuation module M1, M2 to the antenna A or to the next attenuation module M2, M3.

Each switching means (the first switch S1, the second switch S2 and the third switch S3) therefore allows the transceiver 10 to be disconnected from the antenna A and the transceiver 10 to be connected to an associated attenuation module (to the first attenuation module M1, or to the second attenuation module M2, or to the third attenuation module M3), i.e., to connect the transceiver 10 to an impedance (to the first impedance Z1, or to the second impedance Z2, or to the third impedance Z3), electrically connected to ground, of a predetermined value and located at a predetermined distance (respectively at a first distance L1, at a second distance L2, at a third distance L3) from said transceiver 10.

Figure 3A:
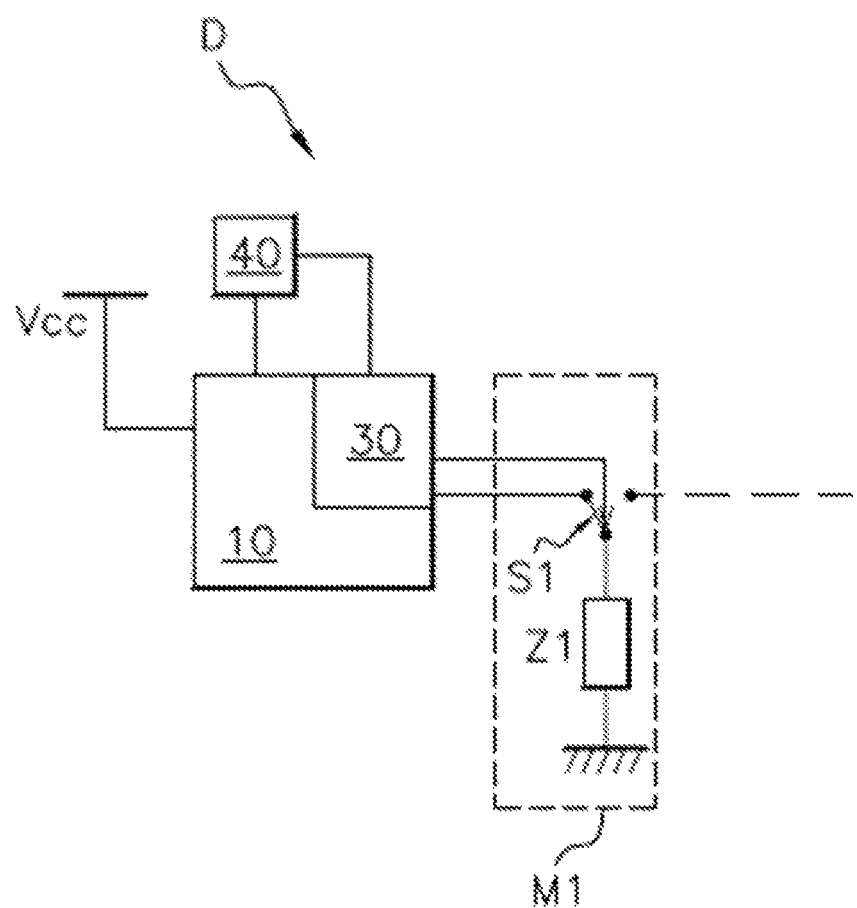
FIG. 3A schematically shows a first configuration of the locating device D of the prior art.

For example, in FIG. 3A, the first switch S1 is in the first position, it electrically connects the transceiver 10 to the first impedance Z1 of the first attenuation module M1, located at a first distance L1 from the transceiver 10. In this first configuration, the transceiver 10 emits an ultra high frequency signal, this signal propagates in the printed circuit of said transceiver 10 and makes the printed circuit resonant at said frequency. The UHF signal also propagates through the communication line 20 up to the first impedance Z1, then to ground. The maximum range of the UHF waves thus generated by the locating device D depends on the first predetermined distance L1 between the first attenuation module M1 and the transceiver 10, as well as the predetermined value of the first impedance Z1. In this first configuration, the first distance L1 and the value of the first impedance Z1 are selected such that the range of the UHF waves thus emitted is limited to a first locating area A1 located in the motor vehicle V (see FIG. 4).

Figure 3B:
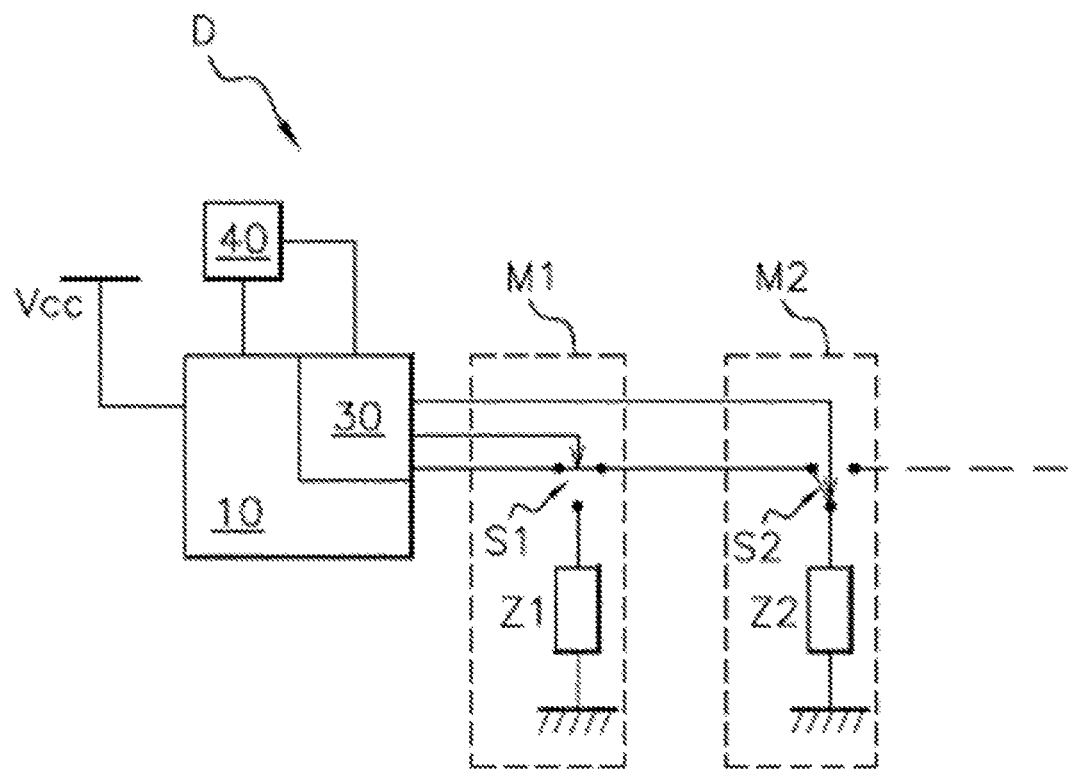
FIG. 3B schematically shows a second configuration of the locating device D of the prior art.

In FIG. 3B, the first switch S1 is in the second position, it electrically connects the transceiver 10 to the second attenuation module M2. The second switch S2 for its part is in the first position, it electrically connects the first attenuation module M1, itself connected to the transceiver 10 at the second impedance Z2, located at a second distance L2 from the transceiver 10.

In this example, the value of the second impedance Z2 is equal to the value of the first impedance Z1, and the second distance L2 is greater than the first distance L1.

Figure 4:
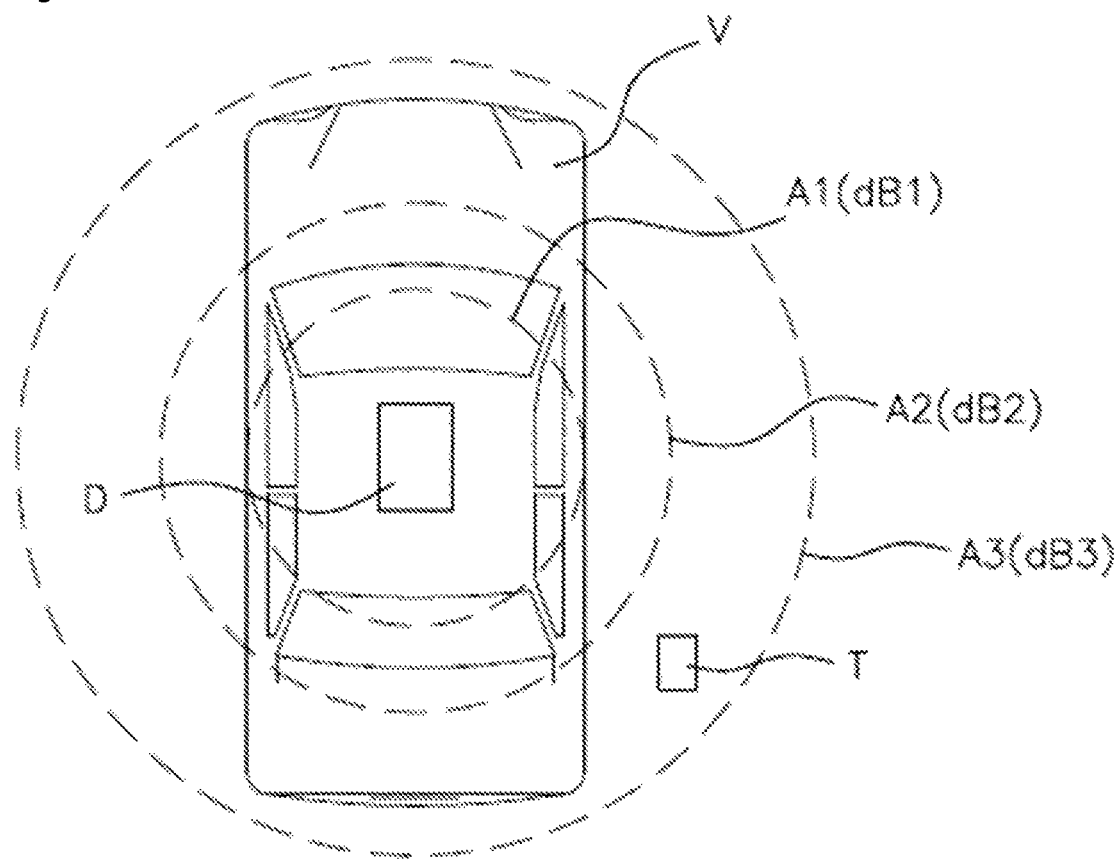
FIG. 4 schematically shows the locating areas of the portable device in and around the motor vehicle, according to the locating device D of the prior art.

In this second configuration of the locating device D, the range of the UHF waves thus emitted is greater than that of the first configuration and defines an outer area close to the motor vehicle V, which is called second locating area A2, said second locating area A2 is centered on the motor vehicle V, is larger than the first locating area A1, and covers the first locating area A1 (see FIG. 4).

Figure 3C:
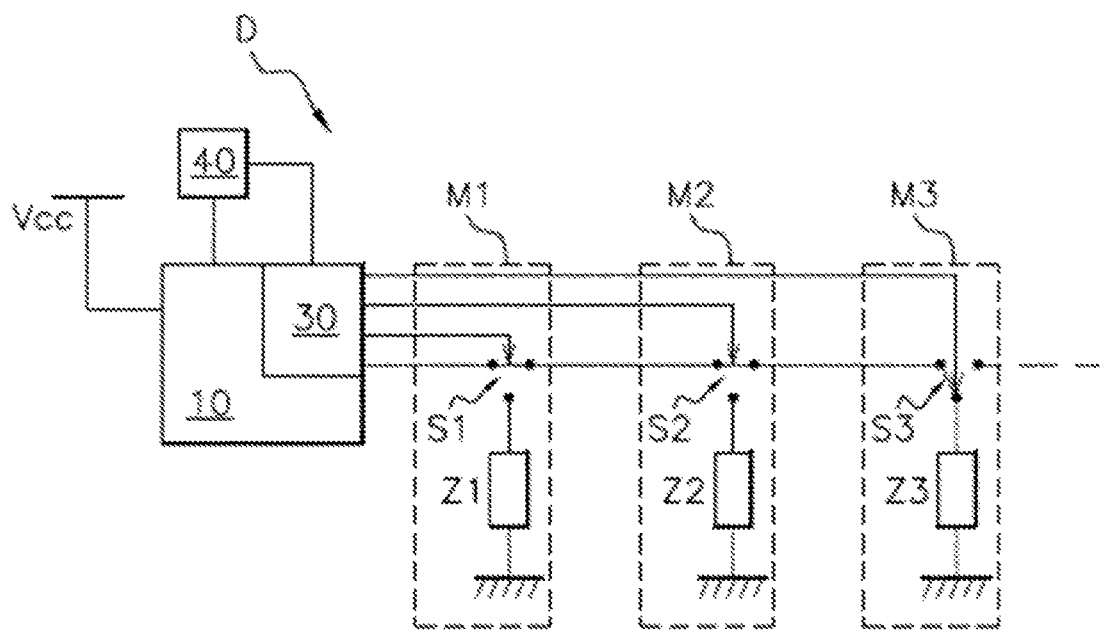
FIG. 3C schematically shows a third configuration of the locating device D of the prior art.

In FIG. 3C, the first switch S1 and the second switch S2 are in the second position. The second switch S2 electrically connects the second attenuation module M2, itself electrically connected to the transceiver 10 by the first switch, to the third impedance Z3. The third switch S3 is in the first position, it electrically connects the second attenuation module M2 (i.e., the transceiver 10) to the third impedance Z3, located at a third distance L3 from the transceiver 10.

In this example, the value of the third impedance Z3 is equal to the value of the second impedance Z2, and the third distance L3 is greater than the second distance L2.

In this third configuration of the locating device D, the range of the UHF waves thus emitted is greater than that of the second configuration and defines a third locating area A3, i.e., an area centered on the motor vehicle V, larger than the second locating area A2 and covering the first and second locating areas A1 and A2 (see FIG. 4).

Finally, a fourth configuration involves switching all the switches S1, S2, S3 to the second position, in this case, the transceiver 10 is connected to the antenna A, and the transmission range of the locating device D is maximal, equal to the Bluetooth® or Bluetooth Low Energy (BLE) range.

Of course, the values of the first, second and third impedances Z1, Z2, Z3 can be different to one another depending on the desired dimensions of the locating areas.

In FIG. 4, solely by way of an example, a portable device T, for example, a portable telephone, is located in the third locating area A3.

When the locating device D is in the third configuration and transmits an identification request via UHF waves, the portable device T located in the third locating area A3 receives the identification request originating from the transceiver 10 and in turn returns its identifier to said transceiver 10.

The identifier received by the transceiver is transmitted to the means 40 for determining the location of the portable device T. As said determination means 40 are connected to the control means 30, the determination means receive information relating to the configuration of the locating device D, more specifically the position of the switching means and consequently the targeted locating area, in this case the third locating area A3. If the received identifier corresponds to an identifier of a portable device T paired with the motor vehicle V, it is considered to be validated and the location means 40 deduce the presence of the portable device T in the third locating area A3.

The control means 30, the transceiver 10 and the determination means 40 can be software means integrated in a control unit (not shown), of the BCM ("Body Control Module" type, or an electronic control module of the passenger compartment).

Figure 5:
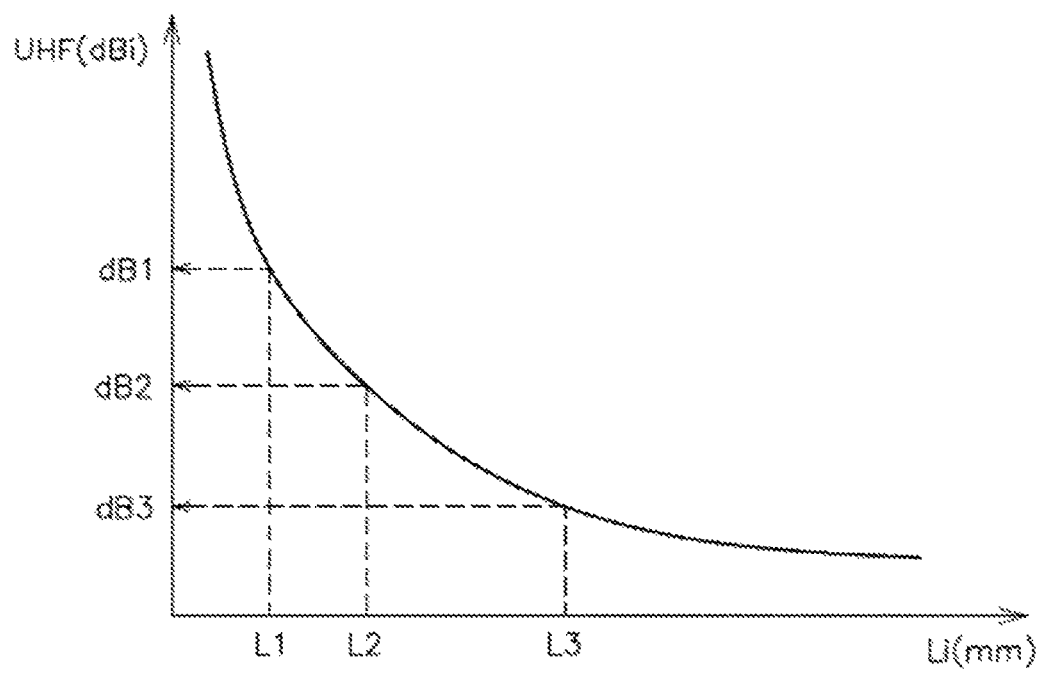
FIG. 5 graphically shows the attenuation of UHF waves in decibels as a function of a predetermined distance.

FIG. 5 graphically shows the attenuation of the UHF waves in decibels (dBi) as a function of each distance (Li), of the first distance L1, of the second distance L2, of the third distance L3 (between the transceiver 10 and the first attenuation module M1, the second attenuation module M2, the third attenuation module M3). Each distance L1, L2, L3 has a corresponding attenuation of the UHF waves dB1, dB2, dB3 and a locating area A1, A2, A3 of the portable device T.

The following formula provides the attenuation dBi of the UHF waves as a function of the distance Li:

$$DBi = A \times \ln(Li) + B \quad \text{[Math 1]}$$

Or also:

$$Li = e^{\left(\frac{(DBi - B)}{A}\right)} \quad \text{[Math 2]}$$

with:

$$B = \frac{C}{4 \times f \times \sqrt{\frac{\varepsilon_{PCB} + \varepsilon_{AIR}}{2}}} \quad \text{[Math 3]}$$

Li: is the predetermined distance;
DBi: is the attenuation in decibels;
A: is a coefficient greater than zero;
f: is the transmission frequency;
$\varepsilon_{PCB}$: is the relative permittivity of the printed circuit of the locating device D;
$\varepsilon_{AIR}$: is the permittivity of the air;
C: is the celerity.

Thus, determining the range of the portable device T will depend on the sensitivity of the portable device T and the attenuation curve of FIG. 5. In practice, when the strength of the signal received by the portable device T drops below the sensitivity of the portable device T, then said device is no longer within range of the transceiver 10.

The first distance L1 corresponds to a first strong attenuation dB1 of the range of the emitted UHF waves, which therefore defines a first locating area A1.

The second distance L2 corresponds to a second attenuation dB2, weaker than the first attenuation, which defines a second locating area A2 larger than the first locating area A1.

The third distance L3 corresponds to low attenuation dB3 of the range of the waves, which therefore defines a third locating area A3 larger than the second locating area A2.

Therefore: A1<A2<A3 and L1<L2<L3, with Z1=Z2=Z3.

For example, if Z1=Z2=Z3=50Ω, and by setting L1=2 mm, L2=10 mm, L3=30 mm, then the maximum range of the UHF waves for each locating area is approximately equal to:

1 meter for locating area A1;
5 meters for locating area A2;
10 meters for locating area A3;

The locating device D therefore allows the portable device T to be located by Ultra High Frequency waves, i.e., via Bluetooth® or Bluetooth Low Energy (BLE), in at least one locating area A1, by disconnecting the transceiver 10 from the antenna A and by connecting the transceiver 10 to an attenuation module M1 or M2, or M3 located at a predetermined distance L1, or L2, or L3 from the transceiver 10 and comprising an impedance Z1, Z2, Z3 of predetermined value connected to ground. The predetermined distance L1, L2, L3 between the transceiver 10 and the attenuation module M1 or M2 or M3, as well as the predetermined value of the impedance Z1, Z2, Z3, define a locating area A1, A2, A3 of the portable device T in and around the motor vehicle V.

In one example, the locating device D comprises a plurality of attenuation modules M1, M2, M3.

In this example, the plurality of attenuation modules M1, M2, M3 allows the predetermined distance between the transceiver 10 and the attenuation module M1, M2, M3 and/or the predetermined value of the impedance Z1, Z2, Z3 to be varied in order to define several locating areas A1, A2, A3 of the portable device T in and around the motor vehicle V, i.e., several areas for emissions of UHF waves with different dimensions in order to precisely locate the portable device T in and around the motor vehicle V.

Figure 1B:
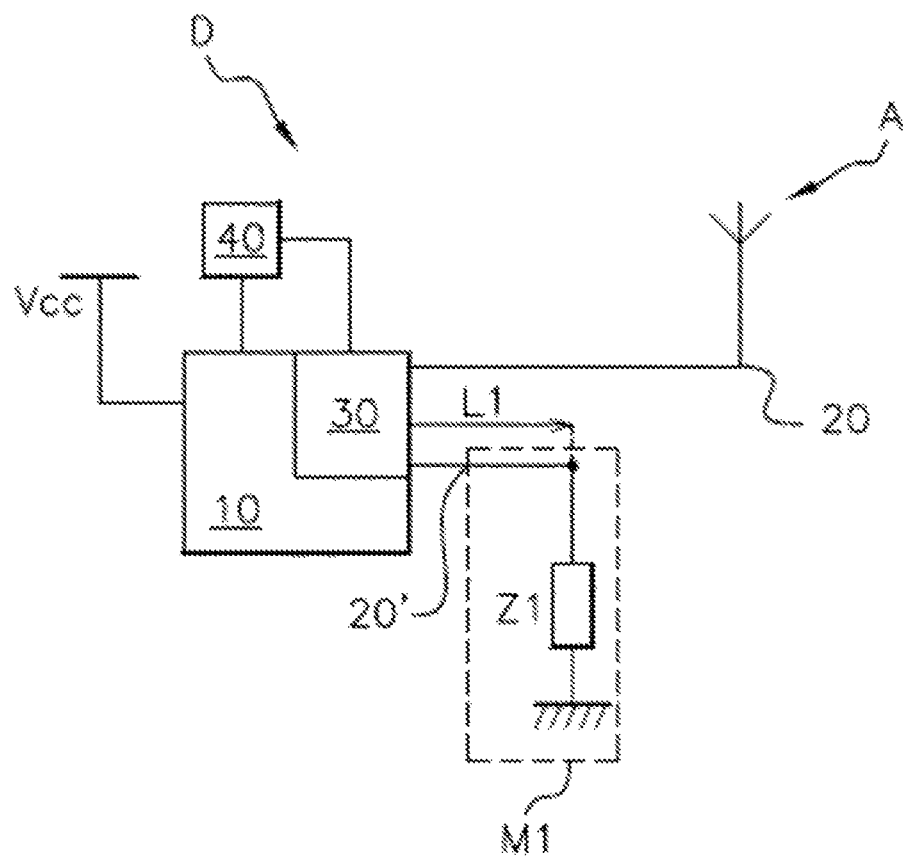
FIG. 1B schematically shows a first implementation of the locating device according to an aspect of the invention.

FIG. 1B shows an implementation of an aspect of the invention, in which the locating device D comprises two communication lines 20, 20'. In practice, a first communication line 20 electrically connects the transceiver 10 to the antenna A, while a second communication line 20' connects the transceiver 10 to at least one attenuation module M1. In this arrangement, the switching means S1 are set to its first position and the control means 30 are configured to alternate the electrical connection of the transceiver 10 with the first communication line 20 and the second communication line 20'. The effect of this arrangement is to separate the transmission chains of short-range and long-range communications. To this end, the first communication line 20 is dedicated to long-range communications and the second communication line 20' is dedicated to short-range communications.

Figure 1C:
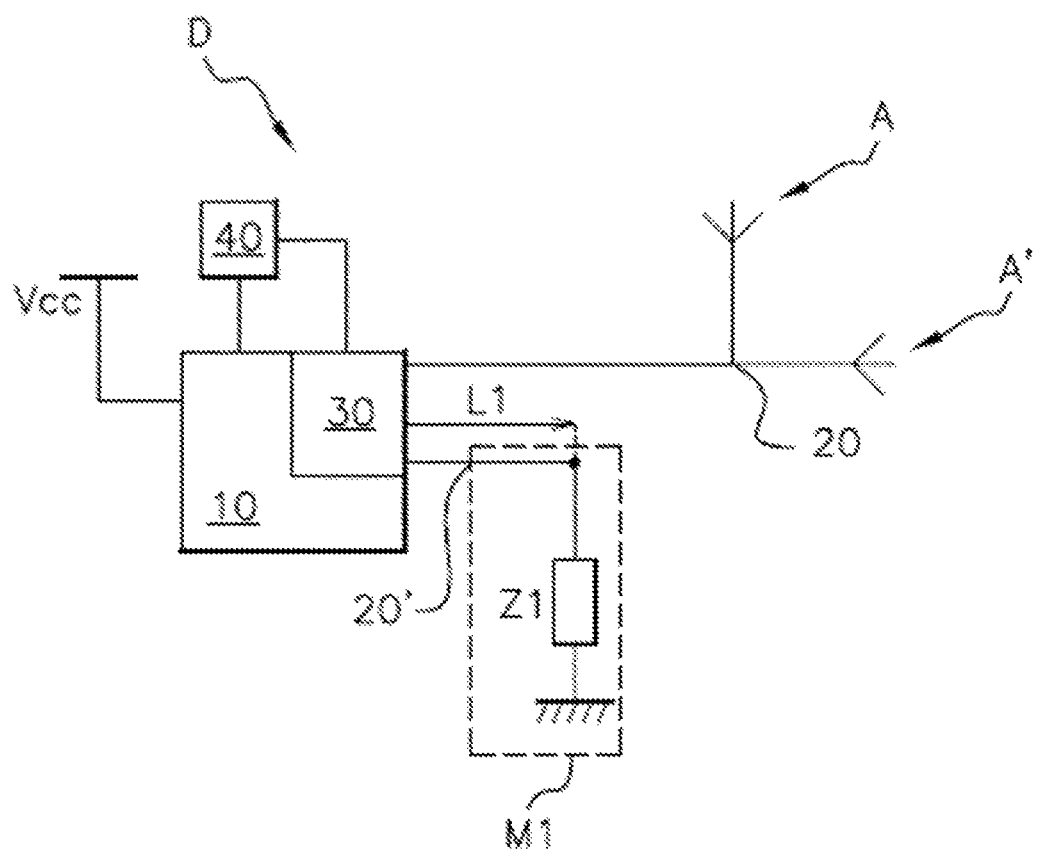
FIG. 1C schematically shows a second implementation of the locating device according to an aspect of the invention.

In one example of this implementation, as shown in FIG. 1C, the locating device D comprises two antennas A, A'. A first antenna A is adapted to generate a vertical or horizontal polarization, while a second antenna A' is adapted to generate a polarization orthogonal to the polarization generated by the first antenna A. In practice, the first communication line 20 electrically connects the transceiver 10 to the antenna A and to the antenna A'. The use of orthogonal polarizations on the antennas A and A' allows the reception of the signals at the portable device T to be improved.

In a variant of the example of this implementation (not shown), the locating device D comprises a third communication line 20''. In practice, the third communication line 20'' electrically connects the transceiver 10 to the antenna A'.

The locating device D of the prior art therefore ingeniously allows the range of the Ultra High Frequency (Bluetooth® or Bluetooth Low Energy (BLE)) waves to be degraded by a maximum range of the prior art of 250 meters to close to a few centimeters, in order to precisely define locating areas of a portable device T in and around a motor vehicle V. With the location method, locating a portable device T via Bluetooth® or Bluetooth Low Energy (BLE) inside a motor vehicle V in order to allow "hands-free" starting is now possible.

However, the effect of this degradation is that it makes long-range communication impossible between the portable device T and the motor vehicle V, i.e., when the portable device T is located outside the locating areas.

However, some uses require a function of the motor vehicle V to be triggered long before the user approaches. This involves, for example, functions for remotely controlling the motor vehicle V, such as locking/unlocking the doors, heating, defogging, de-icing or even starting.

Thus, in an aspect of the invention, the computer 50 is configured to alternate the switching means S1, S2, S3 between the first position and the second position according to a predetermined ratio between an activation duration of the first position and an activation duration of the second position.

In this way, the portable device T and the motor vehicle V can communicate together in order to remotely control the motor vehicle V, while allowing the motor vehicle V to precisely locate the portable device T in and around the motor vehicle V.

In one example, the activation duration of the first position and the activation duration of the second position respectively represent "⅓" and "⅔" of the total activation duration of the first position and the second position.

In another example, the activation duration of the first position and the activation duration of the second position respectively represent "½" and "½" of the total activation duration of the first position and the second position.

Of course, other values for the activation duration of the first position and the activation duration of the second position can be contemplated without requiring substantial modifications of an aspect of the invention.

Furthermore, in an aspect of the invention, as shown in FIG. 2, after at least one dedicated data channel is established between the motor vehicle V and the portable device T ("connected mode"), the system S is also configured for:

the motor vehicle V to send, over at least one predetermined frequency, at least one status request message Mds to the portable device T and for the motor vehicle V to receive at least one status confirmation message Mcs from the portable device T; and the portable device T to receive the status request message Mds and for the portable device T to send the status confirmation message Mcs to the motor vehicle V in response to receiving the status request message Mds.

In a particular implementation, the predetermined frequency depends on the activation duration of the first position and/or the activation duration of the second position.

In a first example, the predetermined frequency depends on the activation duration of the first position. To this end, a predetermined function can be provided that links the predetermined frequency to the activation duration of the first position, so that a predetermined frequency corresponds to a given activation duration of the first position.

In a second example, the predetermined frequency depends on the activation duration of the second position. To this end, a predetermined function can be provided that links the predetermined frequency to the activation duration of the second position, so that a predetermined frequency corresponds to a given activation duration of the second position.

In a third example, a first predetermined frequency depends on the activation duration of the first position and a second predetermined frequency depends on the activation duration of the second position.

Thus, in this third example, when the activation duration of the first position and the activation duration of the second position respectively represent "⅓" and "⅔" of the total activation duration of the first position and of the second position, the first predetermined frequency allows twice as many status request messages Mds to be sent to the portable device T than the second predetermined frequency.

Also, in this third example, when the activation duration of the first position and the activation duration of the second position respectively represent "½" and "½" of the total activation duration of the first position and of the second position, the first predetermined frequency and the second predetermined frequency allow the same number of status request messages Mds to be sent to the portable device T.

Of course, other values of the first predetermined frequency and of the second predetermined frequency can be contemplated without requiring substantial modifications of an aspect of the invention.

In a particular implementation, in which the transceiver 10 comprises a communication interface according to the Bluetooth® or Bluetooth Low Energy (BLE) protocol, the motor vehicle V is also configured to send the status request message Mds in a frame selected between an advertising frame and a data frame.

By way of a reminder, in ultra high frequency communication systems, provision is generally made for data frames to be transmitted after at least one dedicated channel is established between two devices. Thus, by using data frames, an aspect of the invention does not require any modification of the Bluetooth® or Bluetooth Low Energy (BLE) protocol to allow data frames to be transmitted after a dedicated data channel is established between the motor vehicle V and the portable device T.

Furthermore, a person skilled in the art knows that the advertising frames are intended to notify other devices of availability for an exchange of data. In the Bluetooth Low Energy (BLE) protocol, the advertising frames are not transmitted after a dedicated data channel is established between two devices. Thus, an aspect of the invention requires a slight modification of the Bluetooth Low Energy (BLE) protocol to allow advertising frames to be transmitted after a dedicated data channel is established between the motor vehicle V and the portable device T.

The effect of the message exchange mechanism with acknowledgement, as proposed by an aspect of the invention, is to keep the connection on the dedicated channel active.

Indeed, in the ultra high frequency communication systems, the system disconnects a dedicated channel when no message is exchanged between two devices for a predetermined period. For example, in some ultra high frequency communication systems, the predetermined period is set to around 30 seconds.

Thus, in the prior art, when the locating device D locates the portable device T in or around the movable vehicle V, no more exchanges are carried out between the portable device T and the motor vehicle V on the channel established between these two devices. Consequently, this connection channel is disconnected when the predetermined period has elapsed and the locating procedure must restart. In other words, in the prior art, discontinuous location of the portable device T is carried out. The disadvantage of this is that, after the portable device T is located, it is not possible to know whether the portable device is still in a locating area. In other words, if the portable device T moves after being located, it will not be possible to know as such unless the locating device D is reactivated in order to carry out a new locating procedure that requires sending numerous synchronization messages.

The system S according to an aspect of the invention advantageously allows this disconnection to be avoided in order to allow continuous location of the portable device T, by virtue of the message exchange mechanism with acknowledgement that is implemented after a dedicated data channel is established between the motor vehicle V and the portable device T.

Indeed, in an aspect of the invention, the locating procedure is not interrupted, because the system S implements a message exchange mechanism with acknowledgement when the portable device T is located in the motor vehicle V or around said motor vehicle within the maximum range of the Ultra High Frequency waves.

Furthermore, the system S is configured to measure a reception success rate of the status request message Mds over a predetermined measurement period and for the locating device D to trigger the locating procedure if the reception success rate of the status request message Mds is significant.

In practice, in an aspect of the invention, the computer 50 is configured to:
 compute a reception success rate of the status request message Mds by the portable device T; and
 compare the reception success rate of the status request message Mds with a predetermined success rate, in order to control the locating device D so that it locates the portable device T.

In a first example, the computer 50:
 counts, on the motor vehicle V, the number of received confirmation messages; and
 computes the reception success rate of the status request message Mds on the basis of the number of received confirmation messages.

Thus, if during the predetermined measurement period the motor vehicle V has sent six status request messages Mds to the portable device T and has received four status confirmation messages Mcs from the portable device T, then the reception success rate of the status request message Mds will be equal to approximately "⅘", that is approximately 66.66%.

In a second example:
 the portable device T counts the number of received status request messages;
 the portable device T adds the number of received status request messages to the status confirmation message Mcs; and
 the computer 50 computes the reception success rate of the status request message Mds on the basis of the number of received status request messages.

Thus, if during the predetermined measurement period the motor vehicle V has sent six status request messages Mds to the portable device T and the portable device T has received only two of the status request messages Mds, then the reception success rate of the status request message Mds will be equal to "⅔", that is approximately 33.33%.

Figure 6:
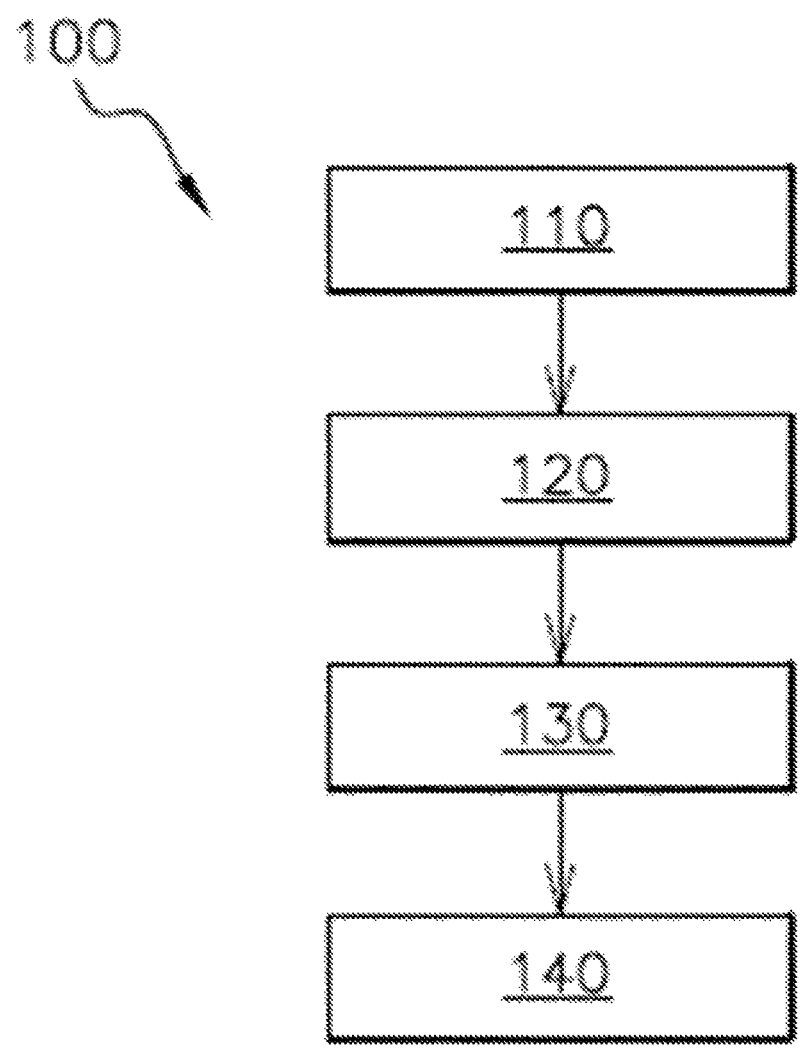
FIG. 6 schematically shows a method for implementing an aspect of the invention.

An aspect of the invention also relates to a method for implementing the system S, as described in FIG. 6.

In the method 100, two arrangements of the motor vehicle V are considered.

In the first arrangement, the transceiver 10 is connected to the antenna A, as explained above.

In the second arrangement, the transceiver 10 is disconnected from the antenna A, then the transceiver 10 is connected to the attenuation module M1, M2, M3 located at a predetermined distance L1, L2, L3 from the transceiver 10, as explained above.

Then, in step 110, the first arrangement and the second arrangement are alternated according to a predetermined ratio between an activation duration of the first arrangement and an activation duration of the second arrangement, as explained above.

Then, in step 120, after at least one dedicated data channel is established between the motor vehicle V and the portable device T, the following are configured:

the motor vehicle V for sending, over at least one predetermined frequency, at least one status request message Mds to the portable device T and for receiving at least one status confirmation message Mcs from the portable device; and the portable device T for receiving the status request message Mds and for sending the status confirmation message Mcs to the motor vehicle V in response to receiving the status request message Mds.

In one example, the predetermined frequency depends on the activation duration of the first arrangement and/or on the activation duration of the second arrangement, as explained above.

In a particular implementation, on the motor vehicle V:
in step 130, a reception success rate of the status request message Mds by the portable device T is computed; and
in step 140, the reception success rate of the status request message Mds is compared with a predetermined success rate, in order to control the locating device D so that it locates the portable device T.

In a first example of the particular implementation, as indicated above:
the number of received confirmation messages is counted on the motor vehicle V; and
the reception success rate of the status request message Mds is computed on the basis of the number of received confirmation messages.

In a second example of the particular implementation, as indicated above:
the number of received status request messages is counted on the portable device T;
the number of received status request messages is added to the status confirmation message Mcs; and
the reception success rate of the status request message Mds is computed on the basis of the number of received status request messages.

The invention claimed is:

1. A method for ultra high frequency communication with, and location of, a portable device for "hands-free" access to a motor vehicle, the motor vehicle having an on-board communication device comprising an ultra high frequency transceiver, an electrical power supply source and at least one antenna, the motor vehicle comprising a first arrangement, in which the transceiver is connected to the at least one antenna, and a second arrangement, in which the transceiver is disconnected from the at least one antenna, then the transceiver is connected to an attenuation module located at a predetermined distance from the transceiver, the attenuation module comprising an impedance of predetermined value connected to ground, the predetermined distance between the transceiver and the attenuation module, as well as the predetermined value of the impedance, defining a locating area of the portable device in and around the motor vehicle, the method comprising:
   a) alternating between the first arrangement and the second arrangement according to a predetermined ratio between an activation duration of the first arrangement and an activation duration of the second arrangement;
   b) a connection over a dedicated channel is kept active after at least one dedicated data channel is established between the motor vehicle and the portable device;
   c) the following are configured:
      a. the motor vehicle is configured to send, over at least one predetermined frequency, at least one status request message to the portable device and to receive at least one status confirmation message;
      b. the portable device is configured to receive the status request message and to send the status confirmation message to the motor vehicle in response to receiving the status request message;
   d) a reception success rate of the status request message by the portable device is computed;
   e) the reception success rate of the status request message is compared with a predetermined success rate;
   f) the portable device is located as a function of the result of the comparison.

2. The method as claimed in claim 1, wherein the at least one predetermined frequency depends on the activation duration of the first arrangement and/or on the activation duration of the second arrangement.

3. The method as claimed in claim 2, wherein the motor vehicle:
counts a number of received confirmation messages; and
computes a reception success rate of the status request message on the basis of a number of received confirmation messages.

4. The method as claimed in claim 2, wherein the portable device:
counts a number of received status request messages;
adds the number of received status request messages to a number of status confirmation messages; and
computes a reception success rate of the status request message on the basis of the number of received status request messages.

5. The method as claimed in claim 1, wherein the motor vehicle:
counts a number of received status confirmation messages; and
computes a reception success rate of the status request message on the basis of a number of received status confirmation messages.

6. The method as claimed in claim 1, wherein the portable device:
counts a number of received status request messages;
adds the number of received status request messages to a number of status confirmation messages; and
computes a reception success rate of the status request message on the basis of the number of received status request messages.

7. A system for ultra high frequency communication with, and location of, a portable device for "hands-free" access, the system comprising an ultra high frequency locating device on-board a motor vehicle and comprising:
an electrical power supply source;
an ultra high frequency transceiver, comprising a printed circuit connected to:
an antenna by a first communication line;
a computer;
the ultra high frequency locating device further comprising:
a second communication line, wherein on the second communication line, at least one attenuation module, located at a predetermined distance from the transceiver, comprising a switching means, and an impedance of predetermined value, is connected to ground;
means for controlling the at least one attenuation module;
means for determining the location of the portable device, electrically connected to the transceiver and to the means for controlling the attenuation module;
the switching means having:
a first position, in which the transceiver is disconnected from the antenna and is electrically connected to the impedance associated with said switching means via the second communication line;
a second position, in which the switching means electrically connects the transceiver to the antenna via the first communication line;
wherein the computer is configured to alternate the switching means between the first position and the second position according to a predetermined ratio between an activation duration of the first position and an activation duration of the second position, to establish at least one dedicated data channel between the motor vehicle and the portable device.

8. The system as claimed in claim 7, wherein, after the at least one dedicated data channel is established between the motor vehicle and the portable device, and a connection on the dedicated channel is kept active, the system is also configured for:
the motor vehicle to send, over at least one predetermined frequency, at least one status request message to the portable device and for the motor vehicle to receive at least one status confirmation message from the portable device; and
for the portable device to receive the at least one status request message and for the portable device to send the at least one status confirmation message to the motor vehicle in response to receiving the at least one status request message.

9. The system as claimed in claim 8, wherein the ultra high frequency transceiver comprises a Bluetooth® or Bluetooth Low Energy protocol communication interface.

10. The system as claimed in claim 7, wherein the ultra high frequency transceiver comprises a Bluetooth® or Bluetooth Low Energy protocol communication interface.

11. The system as claimed in claim 7, wherein the locating device further comprises a second antenna, the antenna being adapted to generate a vertical or horizontal polarization, while the second antenna is adapted to generate a polarization orthogonal to the polarization generated by the antenna.

12. A system for ultra high frequency communication with, and location of, a portable device for "hands-free" access, the system comprising an ultra high frequency locating device on-board a motor vehicle and comprising:
an electrical power supply source;
an ultra high frequency transceiver, comprising a printed circuit connected to:
an antenna by an electric power line;
a computer:
the ultra high frequency locating device further comprising:
on the electric power line, at least one attenuation module, located at a predetermined distance from the transceiver, comprising a switching means, and an impedance of predetermined value, is connected to ground;
means for controlling the at least one attenuation module;
means for determining the location of the portable device, electrically connected to the transceiver and to the means for controlling the attenuation module;
the switching means having:
a first position, in which the transceiver is disconnected from the antenna and is electrically connected to the impedance associated with said switching means;
a second position, in which the switching means electrically connects the transceiver to the antenna;
wherein the computer is configured to alternate the switching means between the first position and the second position according to a predetermined ratio between an activation duration of the first position and an activation duration of the second position, to establish at least one dedicated data channel between the motor vehicle and the portable device,
wherein, after the at least one dedicated data channel is established between the motor vehicle and the portable device, and a connection on the dedicated channel is kept active, the system is also configured for:
the motor vehicle to send, over at least one predetermined frequency, at least one status request message to the portable device and for the motor vehicle to receive at least one status confirmation message from the portable device; and
for the portable device to receive the at least one status request message and for the portable device to send the at least one status confirmation message to the motor vehicle in response to receiving the at least one status request message, and
wherein the motor vehicle is also configured to send the at least one status request message in a frame selected between an advertising frame and a data frame.

* * * * *